United States Patent [19]
Duperon

[11] 3,807,234
[45] Apr. 30, 1974

[54] CORE CATCHER FOR CORE SAMPLERS

[75] Inventor: Terry L. Duperon, Saginaw, Mich.

[73] Assignee: Trippensee Corporation, Saginaw, Mich.

[22] Filed: Aug. 14, 1972

[21] Appl. No.: 280,522

[52] U.S. Cl. .............................. 73/425.2, 175/249
[51] Int. Cl. ......................... G01n 1/08, E21b 9/20
[58] Field of Search .......... 73/425.2; 175/5, 20, 58, 175/249, 405, 403

[56] References Cited
UNITED STATES PATENTS
| | | | |
|---|---|---|---|
| 1,655,644 | 1/1928 | Baker | 175/249 |
| 3,301,336 | 1/1967 | Mount | 175/5 |
| 3,372,760 | 3/1968 | Raymond | 175/5 |

Primary Examiner—S. Clement Swisher
Attorney, Agent, or Firm—Learman & McCulloch

[57] ABSTRACT

A core catcher for a core sampler has a hollow, semi-ellipsoidal body adapted to be fitted into a sample tube and being open at one end to permit material to be sampled to pass into the tube through the body. The body is slit axially from its other end to form a plurality of resilient, flexible, longitudinally and transversely arched fingers which may be flexed outwardly or away from one another as material to be sampled passes through the body. The fingers have convex, free ends which terminate short of one another to minimize scoring of the sample. The fingers are of such length as to enable their free ends to be deflected inwardly of the body into overlapping relation to form a support for material in the tube.

9 Claims, 6 Drawing Figures

CORE CATCHER FOR CORE SAMPLERS

The invention disclosed herein relates to a device for retaining material to be sampled within a sampling tube and more particularly to a core catcher or sample retainer adapted for use in conjunction with a sampling device to retain therein a sample taken from the bottom of a body of water.

In the sampling of the bottom of a body of water it is conventional to embed a hollow, tubular core sampler in the bottom so as to cause a sample of the bottom to be introduced to the tube from the lower, open end thereof. After the sample tube has been embedded to the desired depth in the bottom, the tube is retrieved and the sample extracted therefrom. In the taking of such a sample, it is imperative that the sample be supported within the tube in such manner as to prevent its being washed or drained out of the tube during the retrieval of the latter. For this purpose, a core catcher is mounted within the tube at the lower, open end of the latter.

All of the known core catchers have disadvantages. For example, some of the known core catchers are open at one end and closed at the other until such time as the sample material begins to pass through the core catcher. When a sample tube fitted with a core catcher of this kind is embedded in the bottom of a body of water, a shock wave is generated which often displaces or otherwise disturbs the surface of the material to be sampled, thereby resulting in the taking of an imperfect sample.

Another disadvantage of known core catchers is that they include flexible fingers which are formed in such manner that they may be spread apart to permit passage of the sample through the core catcher, but the fingers bear against the sample with such force that they groove or gouge the sample, thereby disturbing the outer surface of the sample.

Still another disadvantage of known core catchers is that they largely are incapable of retaining a sample having a large percentage of sand. That is, gaps exist in the core catcher which cannot be bridged by sand with the result that a large percentage of a sand sample falls through the core catcher during the retrieval of the sampling tube.

An object of this invention is to provide a core catcher for sampling devices which overcomes the disadvantages referred to above.

Another object of the invention is to provide a core catcher for sampling devices and which is simple and inexpensive to manufacture.

A further object of the invention is to provide a core catcher of the character described which largely avoids disturbing of sample material introduced to the sample tube and which is capable of retaining any kind of material within the tube.

Other objects and advantages of the invention will be pointed out specifically or will become apparent from the following description when it is considered in connection with the appended claims and the accompanying drawing, in which:

Figure 1:
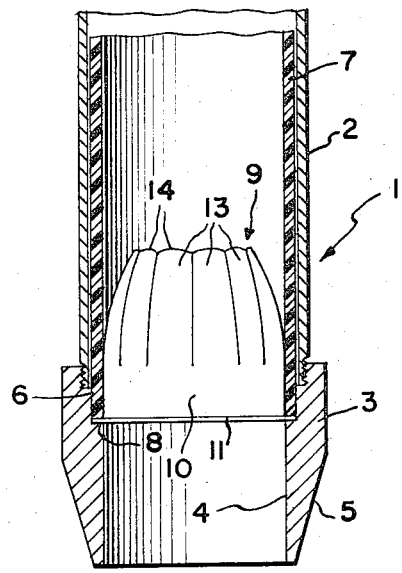
FIG. 1 is a fragmentary, vertical sectional view through a typical core sampling device and illustrating a core catcher constructed in accordance with the invention.

A core catcher constructed in accordance with the invention is adapted for use with a conventional sampling device 1 comprising a metallic sleeve 2 threaded at one end for the accommodation of a correspondingly threaded, metal nose piece 3 having a cylindrical bore 4 and a tapering side wall 5. The bore 4 has a counterbore 6 within which is fitted one end of a transparent tube 7 which also is accommodated within the sleeve 2. A shoulder 8 between the bore 4 and the counterbore 6 forms a seat for the tube 7.

Figure 2:
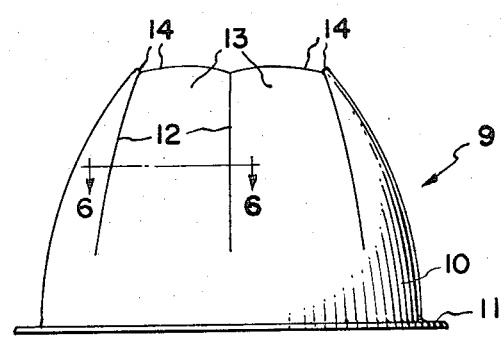
FIG. 2 is a side elevational view, on an enlarged scale, of the core catcher.
Figure 3:
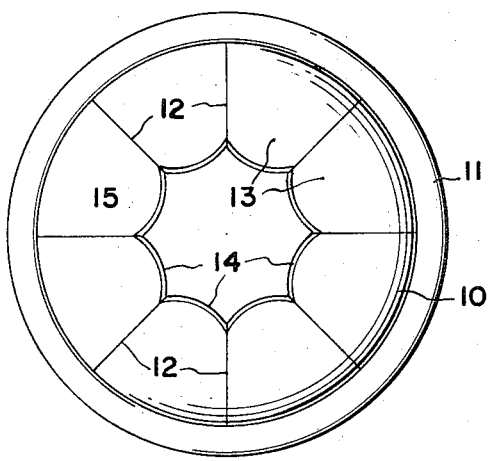
FIG. 3 is a top plan view of the core catcher shown in FIG. 2.

A core catcher constructed in accordance with the embodiment of the invention shown in FIGS. 1 - 3 is designated generally by the reference character 9 and comprises a hollow, semi-ellipsoidal body 10 molded from a flexible, resilient, theremoformable plastic material such as styrene, polyethylene, polypropylene, and the like. The body is open at its larger diameter end and is provided with an integral, peripheral flange 11 of such diameter as to fit within the counterbore 6 between the tube 7 and the shoulder 8. The body 10 is provided with a plurality of axially extending, circumferentially spaced slits 12 extending from the opposite end of the body toward, but terminating short of, the flange 11 so as to provide a plurality of fingers 13. The fingers have free ends 14 which are convex and which terminate short of one another so as to provide a scalloped opening 15 at that end of the body which is remote from the flange 11. The opening 15 in the normal condition of the body is substantially smaller than that at the opposite end of the body.

The length of each slit 12 is uniform so that each finger has a root spaced a uniform distance from the flange 11 and each of the fingers is of uniform length and width. The length of the fingers should be no greater than the diameter of the body 10 at the root of the fingers so as to enable each of the fingers to be deflected inwardly of the body without interference between the free end of the finger and the opposite wall of the body. In practice, the length of each finger 13 preferably is little more than the radius of the body at the root zone of the fingers.

Figure 4:
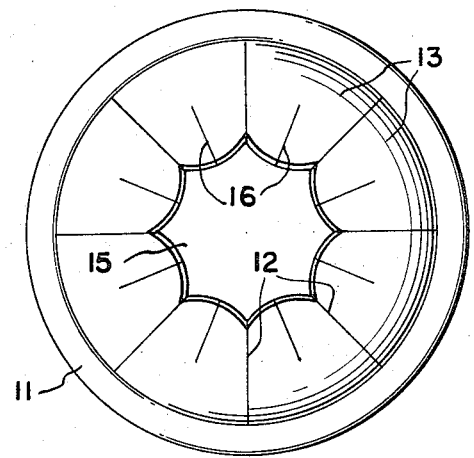
FIG. 4 is a view similar to FIG. 3, but illustrating a modified form of core catcher.

The embodiment shown in FIG. 4 corresponds substantially to the previously described embodiment, but differs from the latter in the provision of axially extending slits 16 in the fingers 13 between the slits 12. The slits 16 preferably are about half the length of the slits 12. The purposes of this construction will be explained hereinafter.

When the sampling apparatus 1 and the core catcher 9 are assembled in the manner shown in FIG. 1, the sampling apparatus may be lowered into a body of water, with the nose piece 3 lowermost, and embedded in the bottom. As the nose piece engages the bottom, the opening 15 in the core catcher prevents or greatly minimizes the generation of a shock wave so as to avoid or greatly minimize disturbing the surface of the sample to be taken.

As the apparatus 1 continues to move into the bottom of the body of water, the material confined within the nose piece will pass through the core catcher 9 and will cause the fingers 13 to be deflected outwardly or toward the wall of the tube 7 so as to enlarge the opening 15. The flexibility of the fingers 13, coupled with the convex configuration of their free ends 14, avoids or greatly minimizes scoring or otherwise marring of the periphery of the core sample. The slits 16, if used, enable the free ends of the fingers 13 to be even more flexible than they otherwise would be, thereby further minimizing the possibility of marring the core sample.

Figure 5:
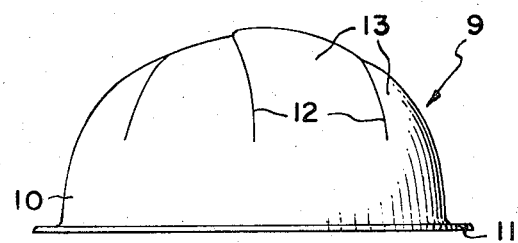
FIG. 5 is a side elevational view illustrating the core catcher in collapsed condition.
Figure 6:
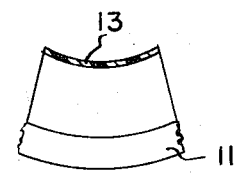
FIG. 6 is a sectional view taken on the line 6—6 of FIG. 2.

When the sampling apparatus has been embedded sufficiently deeply in the bottom of the body of water to obtain the desired sample, the apparatus may be withdrawn from the bottom, whereupon the material within the tube 7 will bear against the upper end of the core catcher 9 and deflect or collapse the fingers 13 inwardly of the body. As the fingers are deflected inwardly, they will move to positions in which their free ends overlap one another so as to close the opening 15. Such movement of the fingers also will cause the sides of adjacent fingers to overlap one another, as is shown in FIG. 5, so as to avoid the creation of spaces between adjacent fingers. In their collapsed condition, therefore, the fingers 13 provide a domed, virtually sealed support for the sample contained within the tube 7. As a consequence, little, if any, of the material constituting the sample can escape from the tube 7. In those instances in which the fingers 13 are slit between their sides, movement of the fingers to their collapsed condition will cause some of the free ends of the fingers to interlock with one another, thereby further rigidifying the core catcher.

Although the body 10 of the core catcher is formed of thin, resilient material, its strength in the collapsed condition is enhanced by the fact that each finger is arched convexly both longitudinally and transversely. The wall thickness of the body may vary from 0.010 inch to about 0.030 inch, with larger diameter bodies having the greater wall thickness.

The number of the fingers 13 with which a core catcher is provided depends, in large measure, upon its diameter. In general, the number of fingers provided will range from eight to 16 with larger diameter core catchers having the greater number of fingers.

In the manufacture of a core catcher in accordance with the invention, the core catcher is formed by an injection or vacuum molding process as one-half of a hollow, preferably 60° ellipsoidal body having an integral flange. The body then is slit and cut to form the fingers and the opening 15. Core catchers constructed in this manner are so inexpensive that a core catcher may be discarded after one use. The core catcher may, however, be formed in other ways.

The disclosed embodiments are representative of presently preferred forms of the invention, but are intended to be illustrative, rather than definitive thereof. The invention is defined in the claims.

What is claimed is:

1. A core catcher for use in a core sampler comprising a hollow semi-ellipsoidal body having a first opening at one end thereof, said body being slit from its opposite end to form a plurality of resilient, flexible fingers adjacent one another, each of said fingers having a free end and terminating short of one another to form a second opening normally smaller in size than that of said first opening, the flexibility and resiliency of said fingers enabling them to be flexed in a direction to increase the size of said second opening in response to the movement of material to be sampled through said body in a direction from said one end thereof toward said opposite end, the flexibility and resiliency of said fingers enabling said fingers also to be flexed in a direction to decrease the size of said second opening, and the length of each of said fingers being such as to enable its free end to overlap the free end of an opposed finger and close said second opening whereby sample material having passed through both of said openings may be supported by the overlapping fingers.

2. A core catcher according to claim 1 wherein the free end of each of said fingers is convex.

3. A core catcher according to claim 1 wherein each of said fingers is arched convexly from side to side.

4. A core catcher according to claim 1 wherein the length of each of said fingers is less than the diameter of said body at the root of said finger.

5. A core catcher according to claim 1 wherein the length of each of said fingers is greater than the radius of said body at the root of said fingers.

6. A core catcher according to claim 1 wherein each of said fingers is slit between its sides and longitudinally from its free end for a distance less than the length of said finger.

7. A core catcher according to claim 1 wherein said body has a peripheral flange at said one end thereof.

8. A core catcher according to claim 1 wherein there are between eight and sixteen of said fingers, each of which is of equal width.

9. A core catcher according to claim 1 wherein said body comprises a truncated 60° ellipsoid.

* * * * *